(12) United States Patent
Kocienda et al.

(10) Patent No.: US 11,899,911 B2
(45) Date of Patent: Feb. 13, 2024

(54) MESSAGE COMPOSITION INTERFACES FOR USE WITH WEARABLE MULTIMEDIA DEVICES

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,503

(22) Filed: Mar. 4, 2022

(65) Prior Publication Data
US 2023/0280883 A1    Sep. 7, 2023

(51) Int. Cl.
G06F 3/048     (2013.01)
G06F 3/0484    (2022.01)
G06F 3/0482    (2013.01)
G06F 3/01      (2006.01)
G06F 3/16      (2006.01)

(52) U.S. Cl.
CPC ............ *G06F 3/0484* (2013.01); *G06F 3/017* (2013.01); *G06F 3/0482* (2013.01); *G06F 3/167* (2013.01)

(58) Field of Classification Search
CPC ........ G06F 3/017; G06F 3/167; G06F 3/0482; G06F 3/0484
See application file for complete search history.

(56) References Cited

U.S. PATENT DOCUMENTS

| 7,437,450 | B1 * | 10/2008 | Gore | H04L 41/5009 |
| | | | | 709/224 |
| 2013/0205219 | A1 * | 8/2013 | Moha | G06F 16/9535 |
| | | | | 715/748 |
| 2014/0365919 | A1 * | 12/2014 | Shaw | H04L 65/403 |
| | | | | 715/753 |
| 2016/0065509 | A1 * | 3/2016 | Yang | G06F 3/0482 |
| | | | | 715/752 |

(Continued)

OTHER PUBLICATIONS

International Search Report and Written Opinion in International Appln. No. PCT/US2023/014531, dated Apr. 11, 2023, 15 pages.

(Continued)

*Primary Examiner* — Claudia Dragoescu
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device presents a user interface for composing a message. The device receives a first user input indicating a recipient of the message and first data for inclusion in the message. In response, the device presents at least the recipient and the first data in a first user interface element of the user interface. Further, subsequent to receiving the first user input, the device receives a second user input indicating a selection of a first application or service from a plurality of applications or services presented in a second user interface element of the user interface. Subsequently, the device transmits the message to the recipient using the first application or service.

20 Claims, 13 Drawing Sheets

(56) References Cited

U.S. PATENT DOCUMENTS

2017/0123487 A1    5/2017    Hazra et al.
2021/0117680 A1*    4/2021    Chaudhri ............ G06F 3/04847

OTHER PUBLICATIONS

Kanel, "Sixth Sense Technology," Thesis for the Bachelor Degree of Engineering in Information and Technology, Centria University of Applied Sciences, May 2014, 46 pages.

Mann et al., "Telepointer: Hands-Free Completely Self Contained Wearable Visual Augmented Reality without Headwear and without any Infrastructural Reliance", IEEE Fourth International Symposium on Wearable Computers, Atlanta, GA, USA, Oct. 16-17, 2000, 4 pages.

Mann, "Wearable Computing: A First Step Toward Personal Imaging, " IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

\* cited by examiner

| Streams | Users | Userdevices | Devices |
|---|---|---|---|
| streamid<br>deviceid<br>start<br>end<br>lat<br>lon<br>attributes<br>entities | userid<br>deviceid<br>email<br>fname<br>lname | userid<br>deviceid | deviceid<br>started<br>state<br>modified<br>created |

| ProcessingResults | Entities | EntityTypes | EntityAssociations |
|---|---|---|---|
| streamid<br>ai<br>result<br>callback<br>duration<br>accuracy | entityID<br>userid<br>entityName<br>entityType<br>entityAttribute | person<br>place<br>thing<br>event | entity 1<br>entity 2 |

FIG. 5

MESSAGE COMPOSITION INTERFACES FOR USE WITH WEARABLE MULTIMEDIA DEVICES

TECHNICAL FIELD

This disclosure relates generally to user interfaces for use with wearable multimedia devices.

BACKGROUND

High-precision laser scanners (e.g., MEMS scanners) have been developed that can turn any surface into a virtual interface (VI). For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface. In the case of the user's palm, there is very little surface area in which to project a detailed VI. This limited space can limit the number and types of user interactions with the VI, and thus potentially limit the number and types of applications that rely on the VI for input and output.

SUMMARY

Systems, methods, devices and non-transitory, computer-readable storage mediums are disclosed for a laser projected VI.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can present a VI that allows a user to compose and send a message to one or more other users. This VI may also be referred to as a message composition interface.

In some implementations, the message composition interface can be configured to receive first user input specifying the recipient of the message and the contents of the message, and second user input specifying a particular application and/or service for transmitting the message (e.g., an email application or service, a text message application or service, a social media application or service, a chat message application or service, etc.). Further, the message composition interface can be configured to receive the first user input (e.g., specifying the recipient and the contents of the message) prior to receiving the second user input (e.g., specifying the application and/or service for transmitting the message).

As an example, the message composition interface can include a composition user interface (UI) element for receiving the recipient of the message, and text, images, video, and/or other content for inclusion in the message. Further, the message composition interface can present one or more selectable options, each corresponding to a different available application and/or service for sending the message. Using the composition UI element, the user can initially specify the recipient of the message and provide text, images, video, and/or other content for inclusion in the message. Subsequently, the user can select a particular application and/or service for sending the message.

The implementations described herein can provide various technical benefits. For instance, the message composition interfaces can allow a user to compose and transmit messages using the wearable multimedia device in a more intuitive manner. As an example, when a user wishes to send a message to another user, the user may often be focused on the recipient of the message and the contents of the message, rather than the application and/or services that she wishes to use to transmit the message. The message composition interfaces allow the user to specify the recipient and the contents of the message first (e.g., prior to specifying the application and/or services that she wishes to use to transmit the message), such that the user is less likely to lose her train of thought or become distracted. Accordingly, the user is less likely to make mistakes in interacting with the wearable multimedia device.

Further, by reducing the occurrence of erroneous and/or unintended input by the user, the message composition interfaces can reduce the resources expended by the wearable multimedia device during operation. For instance, if a user provides erroneous and/or unintended input to the wearable multimedia device, the wearable multimedia device may perform certain operations unnecessarily (e.g., contrary to the user's intentions). Further, the user may spend more time interacting with the wearable multimedia device to correct or reverse her erroneous inputs. Accordingly, the wearable multimedia device may expend resources—such as computational resources (e.g., CPU cycles), memory resources, storage resources, network resources, and/or battery resources—that might otherwise not need to be expended. By reducing the likelihood of user error in interacting with the VI, the wearable multimedia device can reduce the expenditure of resources in correcting or reversing those errors. Thus, the wearable multimedia device can operate in a more efficient manner.

In at least some embodiments, a method includes: presenting, by a wearable multimedia device, a user interface for composing a message, where the user interface includes: a first user interface element configured to present contents of the message, and a second user interface element configured to present a plurality of applications or services for transmitting the message; receiving, by the wearable multimedia, a first user input indicating: a recipient of the message, and first data for inclusion in the message; responsive to receiving the first user input, presenting, by the wearable multimedia device, at least the recipient and the first data in the first user interface element; subsequent to receiving the first user input, receiving, by the wearable multimedia device, a second user input indicating a selection of a first application or service from the plurality of applications or services presented in the second user interface element; and subsequent to receiving the second user input, transmitting, by the wearable multimedia device, the message to the recipient using the first application or service.

Embodiments can include one or more of the following features.

In some embodiments, the wearable multimedia device can transmit the message responsive to receiving the second user input.

In some embodiments, the method can further include receiving, by the wearable multimedia device, a third user input instructing the wearable multimedia device to transmit the message. The wearable multimedia device can transmit the message responsive to receiving the third user input.

In some embodiments, presenting the user interface can include projecting, using a laser projector of the wearable multimedia device, the user interface on a surface.

In some embodiments, the surface can be a surface of a hand of a user.

In some embodiments, the surface can be a palm of a user.

In some embodiments, receiving the first user input can include: generating, using one or more microphones of the wearable multimedia device, a first audio signal representing a first spoken command by a user; and determining the first user input based on the first audio signal.

In some embodiments, receiving the second user input can include: generating, using the one or more microphones of the wearable multimedia device, a second audio signal representing a second spoken command by the user; and determining the second user input based on the second audio signal.

In some embodiments, receiving the first user input can include: detecting, using one or more cameras or depth sensors of the wearable multimedia device, one or more first gestures performed by the user; and determining the first user input based on the one or more first gestures.

In some embodiments, receiving the second user input can include: detecting, using the one or more cameras or depth sensors of the wearable multimedia device, one or more second gestures performed by the user; and determining the second user input based on the one or more second gestures.

In some embodiments, the plurality of applications or services can at least one of: an e-mail application or service, a text message application or service, a chat application or service, or a collaboration application or service.

In some embodiments, the method can further include, responsive to receiving the first user input, modifying the second user interface element based on the recipient.

In some embodiments, modifying the second user interface elements can include: determining an availability of the recipient to receive messages using a first subset of the plurality of applications or services; and visually emphasizing the first subset of the plurality of applications or services in the second user interface element.

In some embodiments, determining the availability of the recipient to receive messages using the first subset of the plurality of applications or services can include: obtaining, for each of the plurality of applications or services, presence information regarding the recipient, where the presence information indicates at least one of an availability or an unavailability of the recipient to receive messages using that application or service; and determining, based on the presence information, that the recipient is available to receive messages using the first subset of the plurality of applications or services.

In some embodiments, modifying the second user interface elements can include: determining an unavailability of the recipient to receive messages using a second subset of the plurality of applications or services; and at least one of: removing the second subset of the plurality of applications or services from the second user interface element, or visually deemphasizing the second subset of the plurality of applications or services in the second user interface element.

In some embodiments, modifying the second user interface elements can include: obtaining historical data including previous communications between the user and the recipient; determining that the user and the recipient previously communicated with one another using a particular application or service from among the plurality of application or service; and visually emphasizing that application or service in the second user interface element.

In some embodiments, modifying the second user interface elements can include: determining a quality metric for each of the plurality of applications or services; and visually emphasizing one or more of the plurality of applications or services based on the quality metrics.

In some embodiments, for each of the plurality of applications or services, the quality metric can represent at least one of: a reliability of the application or service, or a latency of the application or service.

In some embodiments, modifying the second user interface element can include at least one of: modifying an order of the plurality of applications or services, filtering the plurality of applications or services, visually emphasizing at least some of the plurality of applications or services, or visually deemphasizing at least some of the plurality of applications or services.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

DETAILED DESCRIPTION

Example Wearable Multimedia Device

Figure 1:
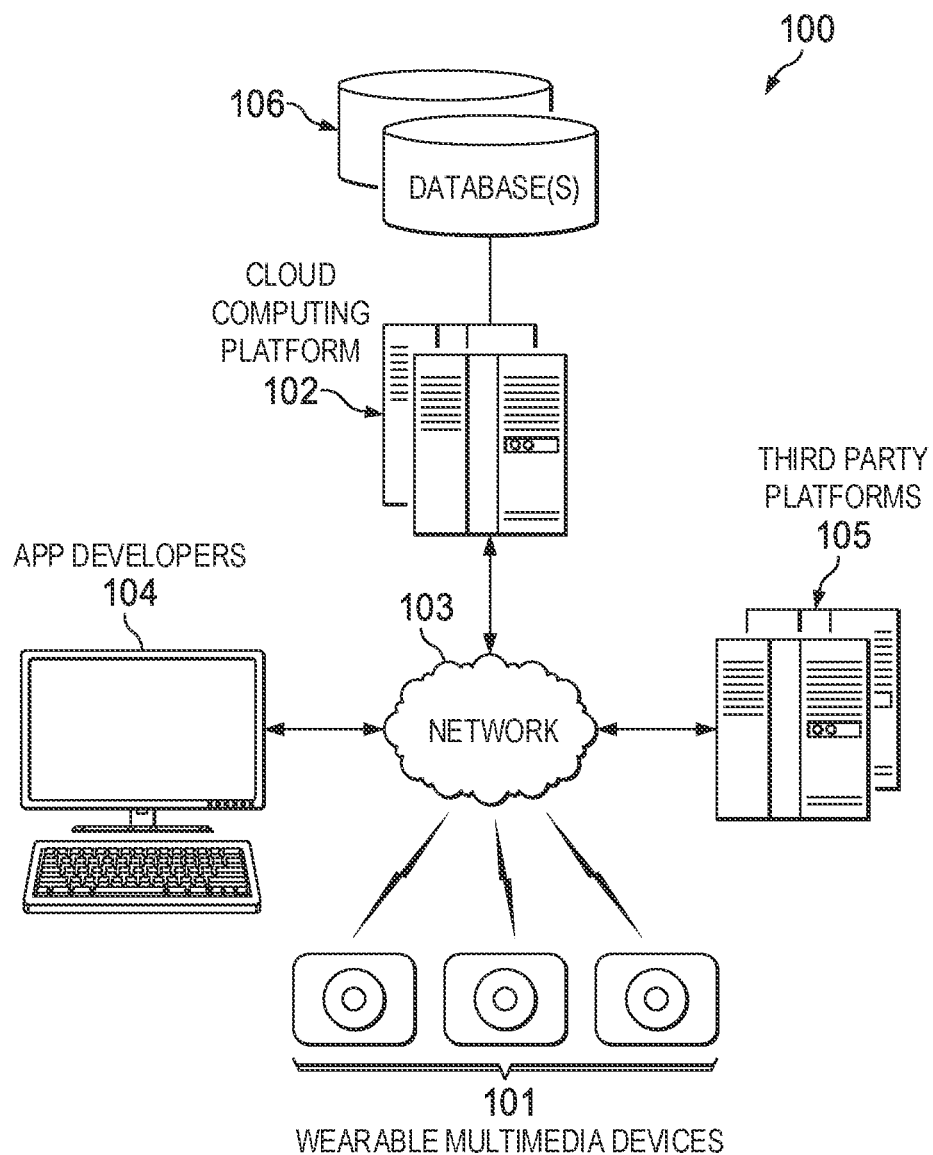
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
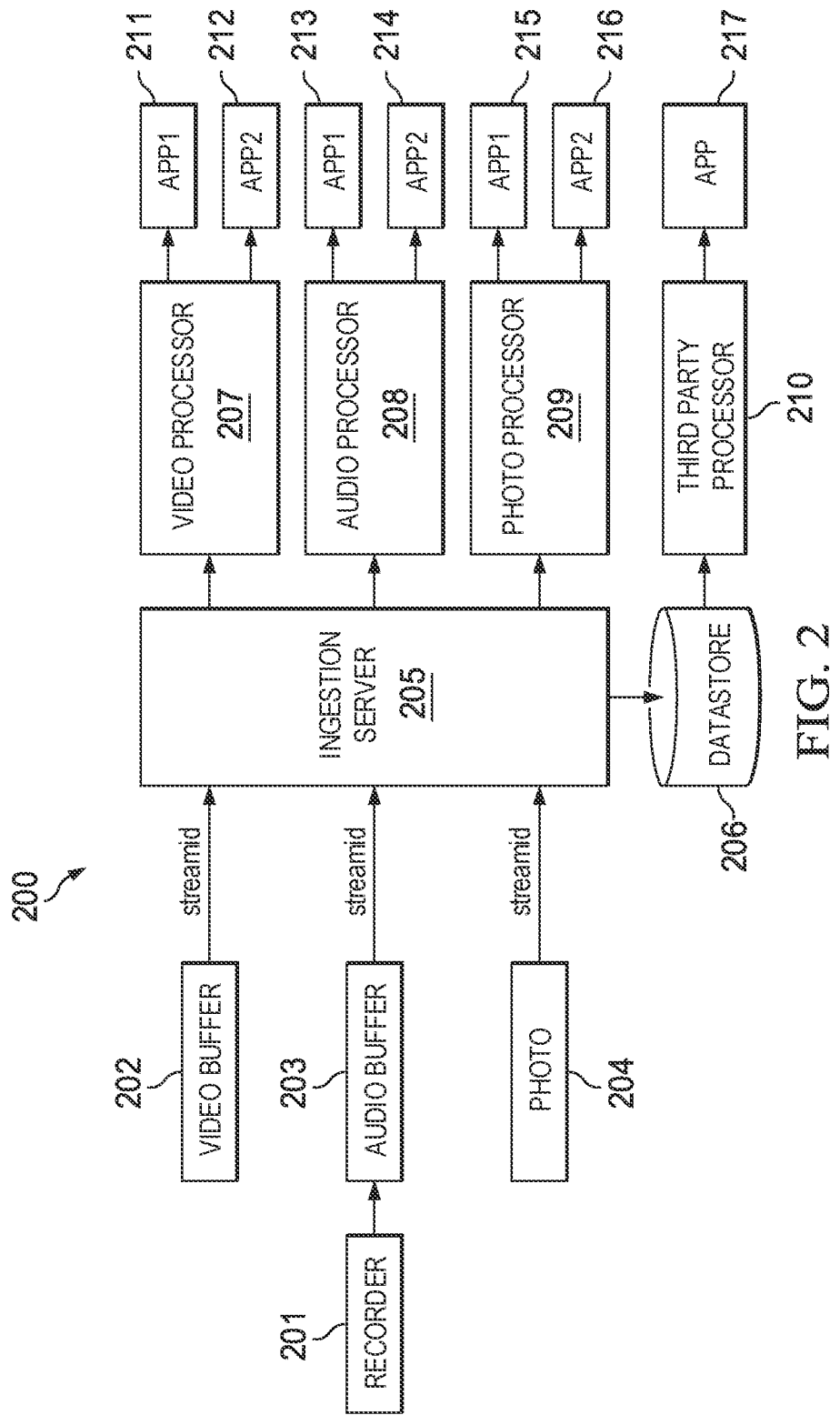
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
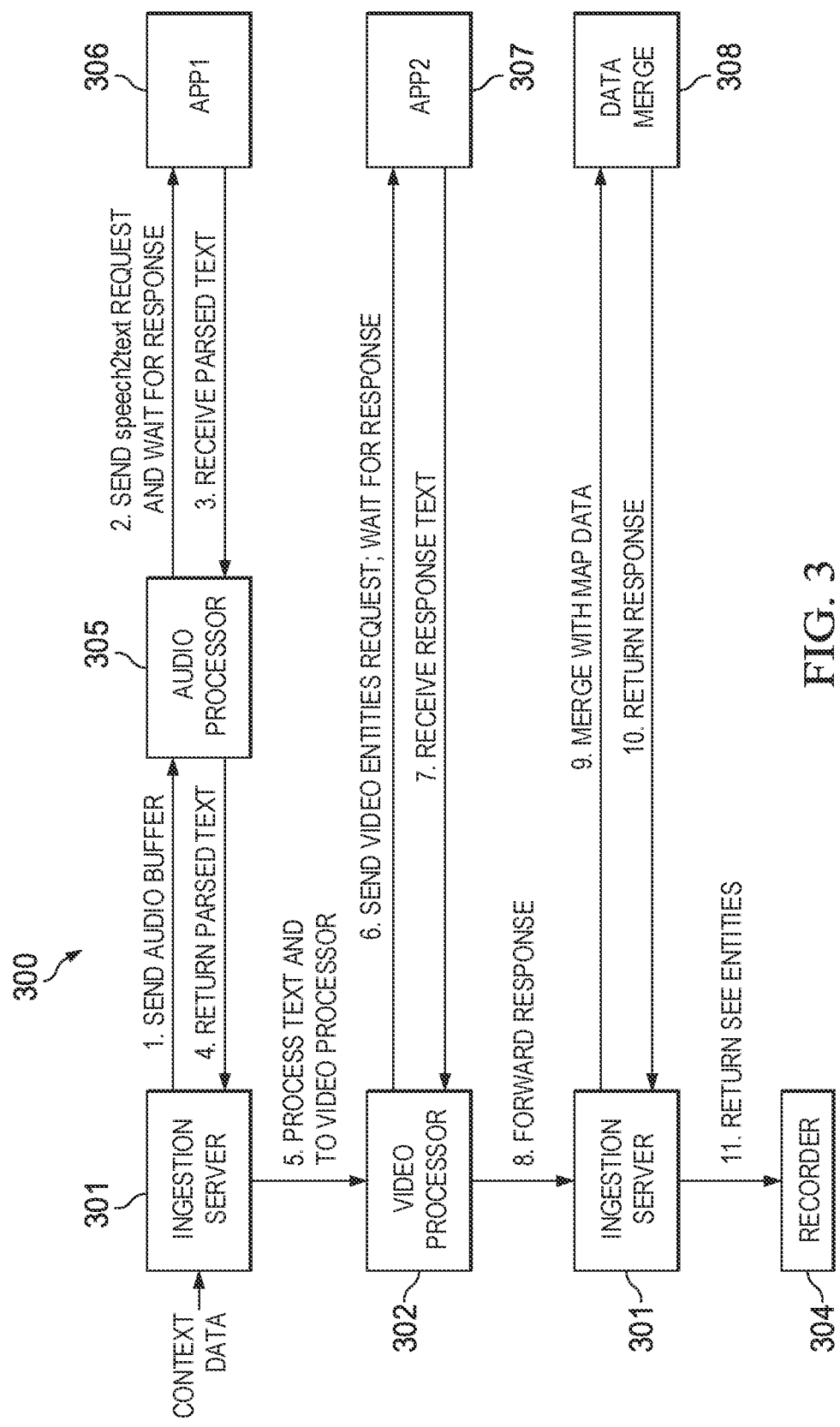
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
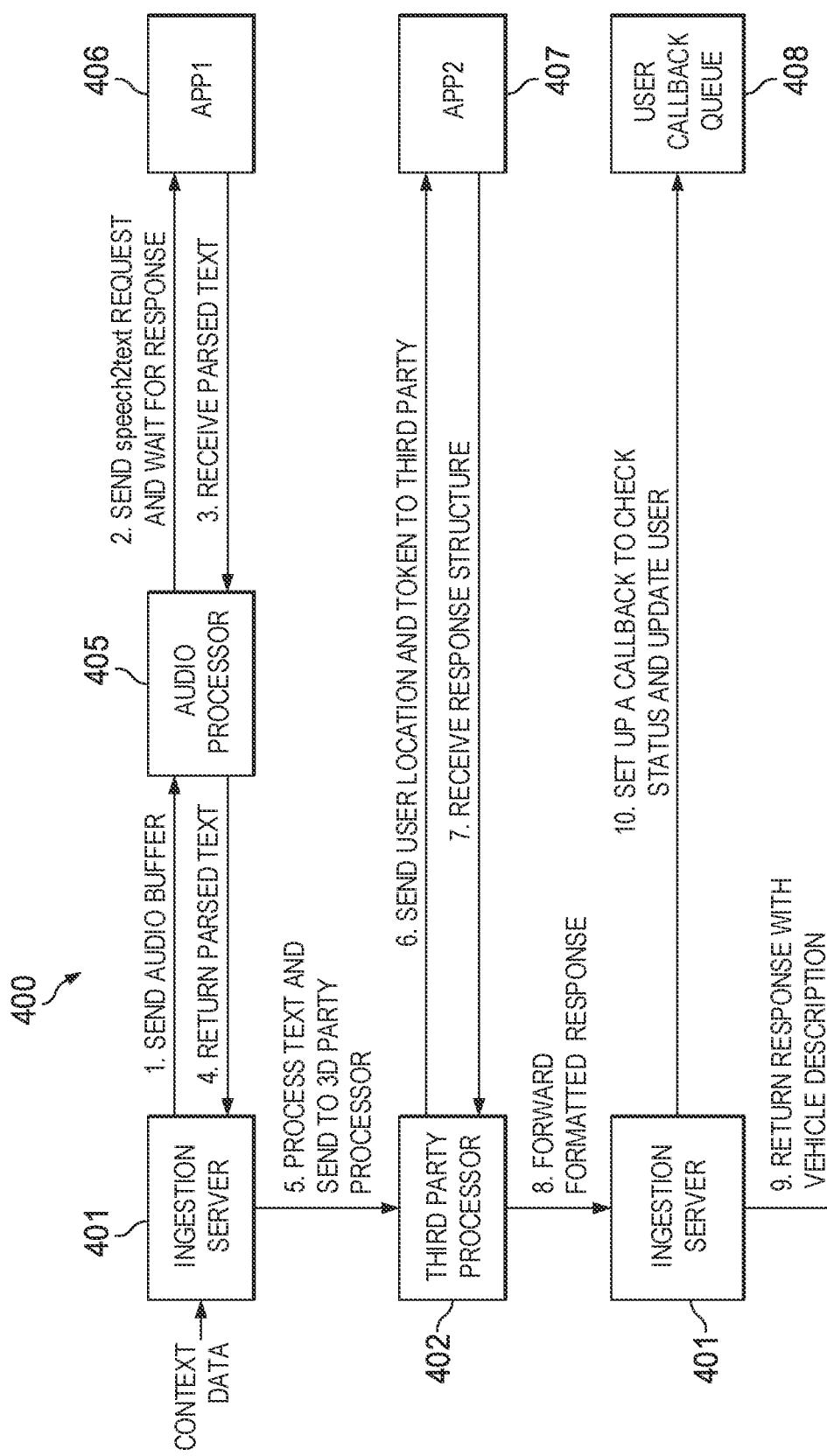
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
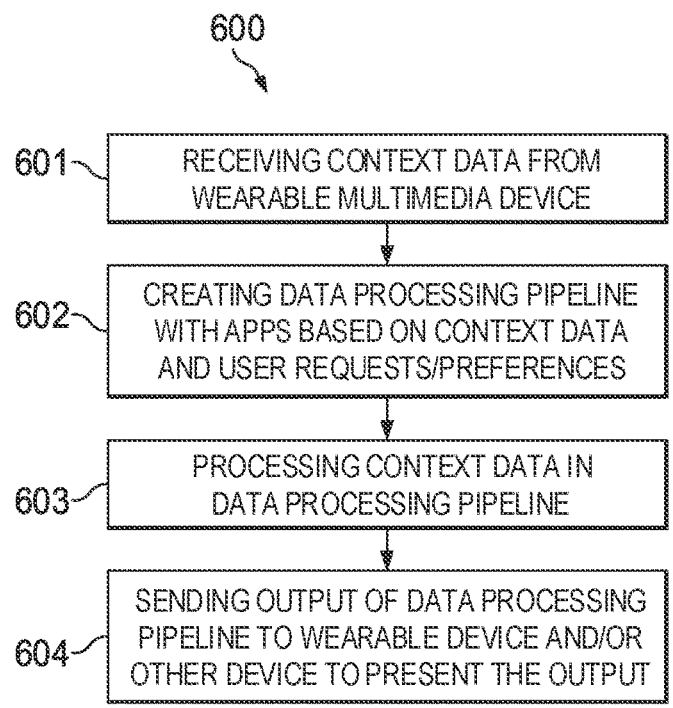
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
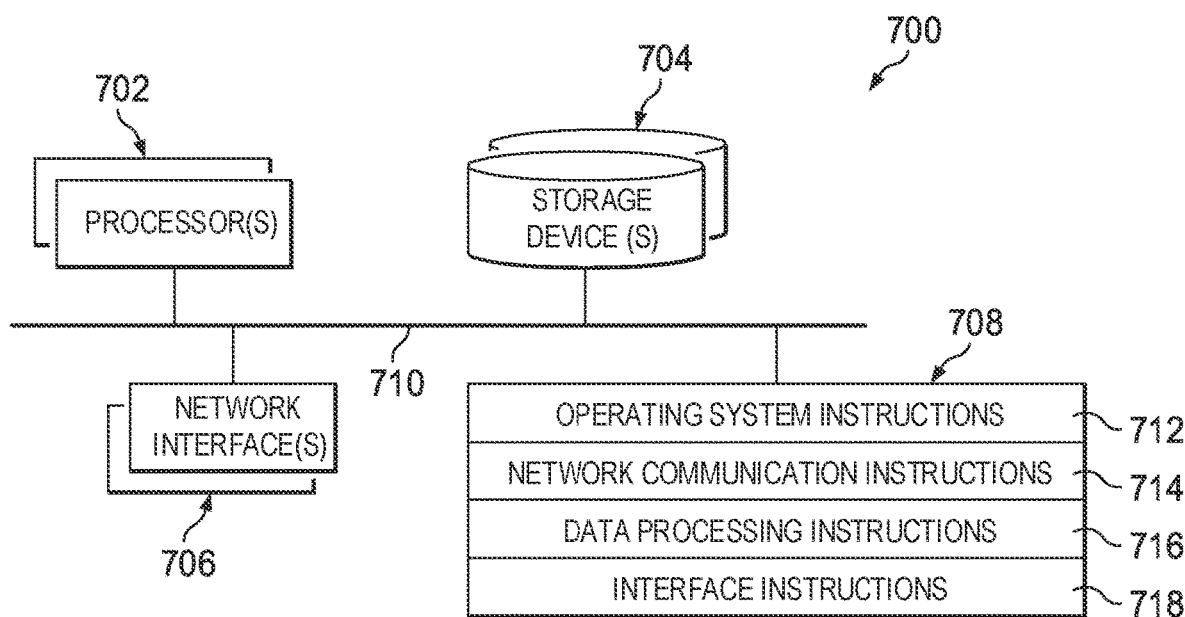
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
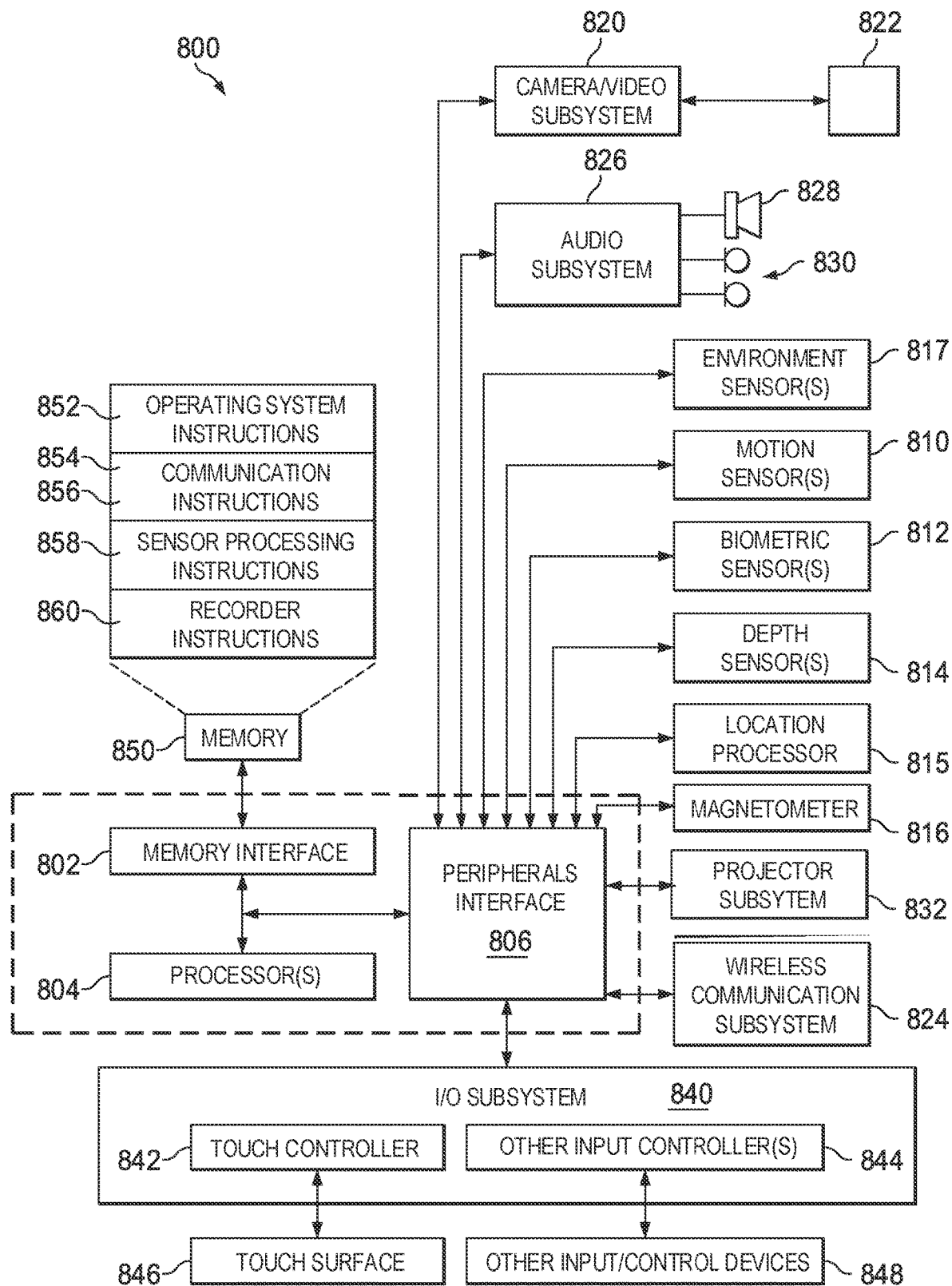
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm) is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
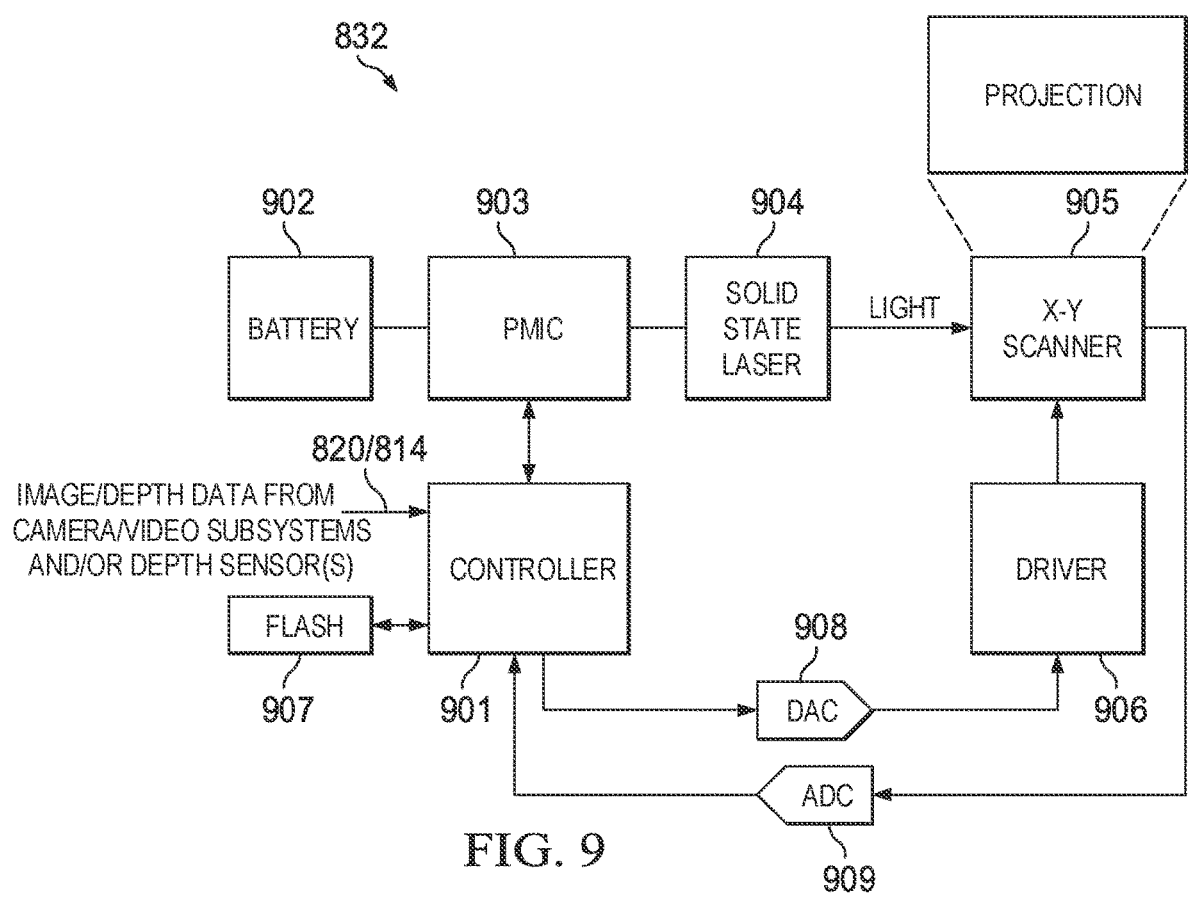
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. In some implementations, a user can perform a gesture using a single hand at a time (e.g., using the hand upon which the VI is projected or her other hand). In some implementations, a user can perform a gesture using two hands concurrently. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to compose and send a message to one or more other users. This VI may also be referred to as a message composition interface.

Figure 10:
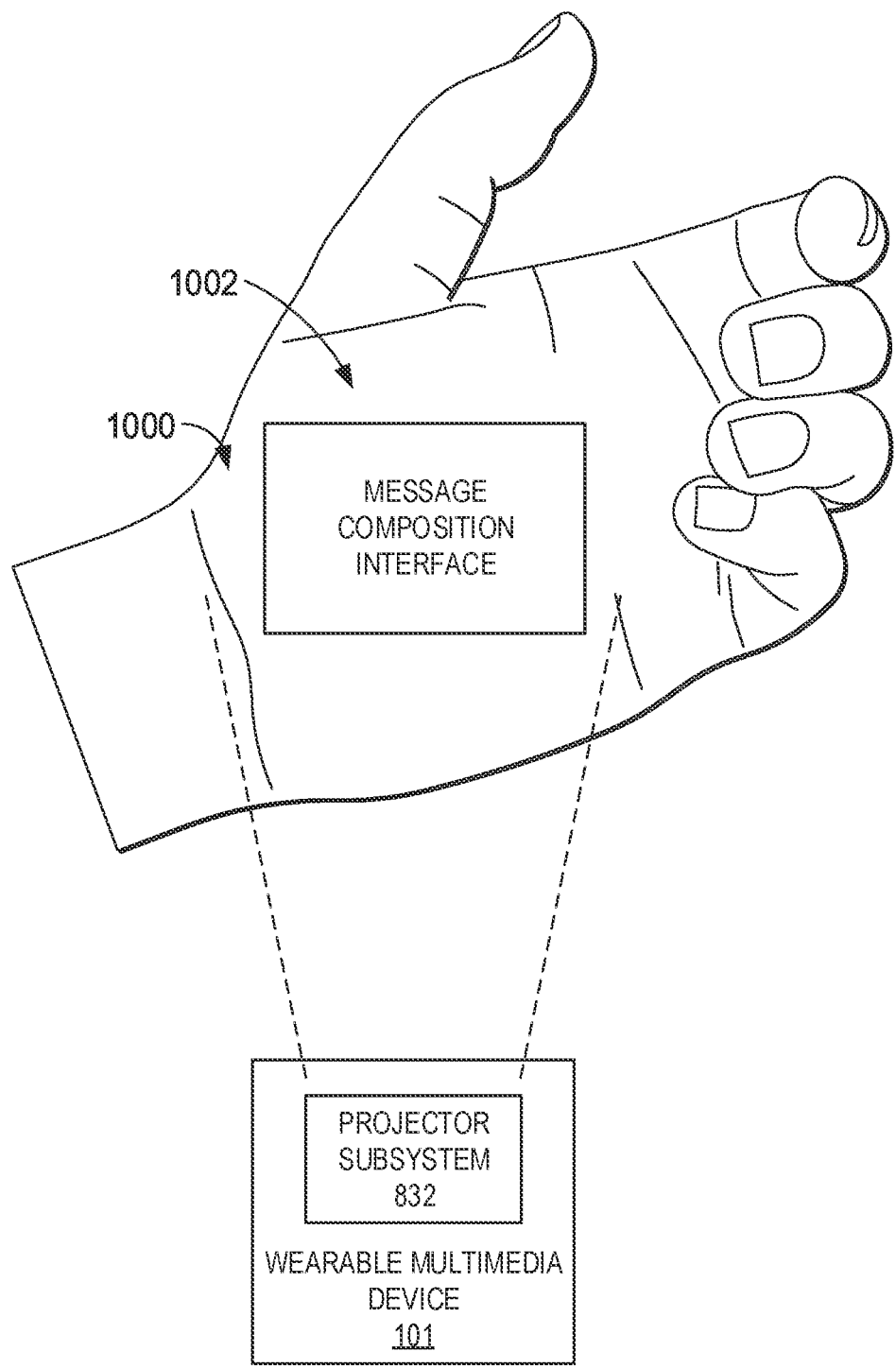
FIG. 10 is a diagram of an example virtual interface, according to an embodiment.

As an illustrative example, FIG. 10 shows a message composition interface 1000 projected by a projector subsystem 832 onto a user's palm 1002. The user can interact with the message composition interface 1000 to compose and send messages to one or more other users (also referred to herein as "recipients"). In some implementations, the message composition interface 1000 can be used to compose and transmit text messages, emails, chat messages, and/or any other type of electronic message.

In some implementations, the message composition interface 1000 can be configured to receive first user input specifying the recipient of the message and the contents of the message, and second user input specifying a particular application and/or service for transmitting the message. Further, the message composition interface can be configured to receive the first user input (e.g., specifying the recipient and the contents of the message) prior to receiving the second user input (e.g., specifying the application and/or service for transmitting the message).

As an example, the message composition interface 1000 can include a composition user interface (UI) element for receiving the recipient of the message, and text, images, video, and/or other content for inclusion in the message. Further, the message composition interface can present one or more selectable options, each corresponding to a different available application and/or service for sending the message. Using the composition UI element, the user can initially specify the recipient of the message and provide text, images, video, and/or other content for inclusion in the message. Subsequently, the user can select a particular application and/or service for sending the message.

The implementations described herein can provide various technical benefits. For instance, the message composition interfaces can allow a user to compose and transmit messages using the wearable multimedia device 101 in a more intuitive manner. As an example, when a user wishes to send a message to another user, the user may often be focused on the recipient of the message and the contents of the message, rather than the application and/or services that she wishes to use to transmit the message. The message composition interfaces allow the user to specify the recipient and the contents of the message first (e.g., prior to specifying the application and/or services that her wishes to use to transmit the message), such that the user is less likely to lose her train of thought or become distracted. Accordingly, the user is less likely to make mistakes in interacting with the wearable multimedia device 101.

Further, by reducing the occurrence of erroneous and/or unintended input by the user, the message composition interfaces can reduce the resources expended by the wearable multimedia device 101 during operation. For instance, if a user provides erroneous and/or unintended input to the wearable multimedia device 101, the wearable multimedia device 101 may perform certain operations unnecessarily (e.g., contrary to the user's intentions). Further, the user may spend more time interacting with the wearable multimedia device 101 to correct or reverse her erroneous inputs. Accordingly, the wearable multimedia device 101 may expend resources—such as computational resources (e.g., CPU cycles), memory resources, storage resources, network resources, and/or battery resources—that might otherwise not need to be expended. By reducing the likelihood of user error in interacting with the VI, the wearable multimedia device 101 can reduce the expenditure of resources in correcting or reversing those errors. Thus, the wearable multimedia device 101 can operate in a more efficient manner.

Figure 11:
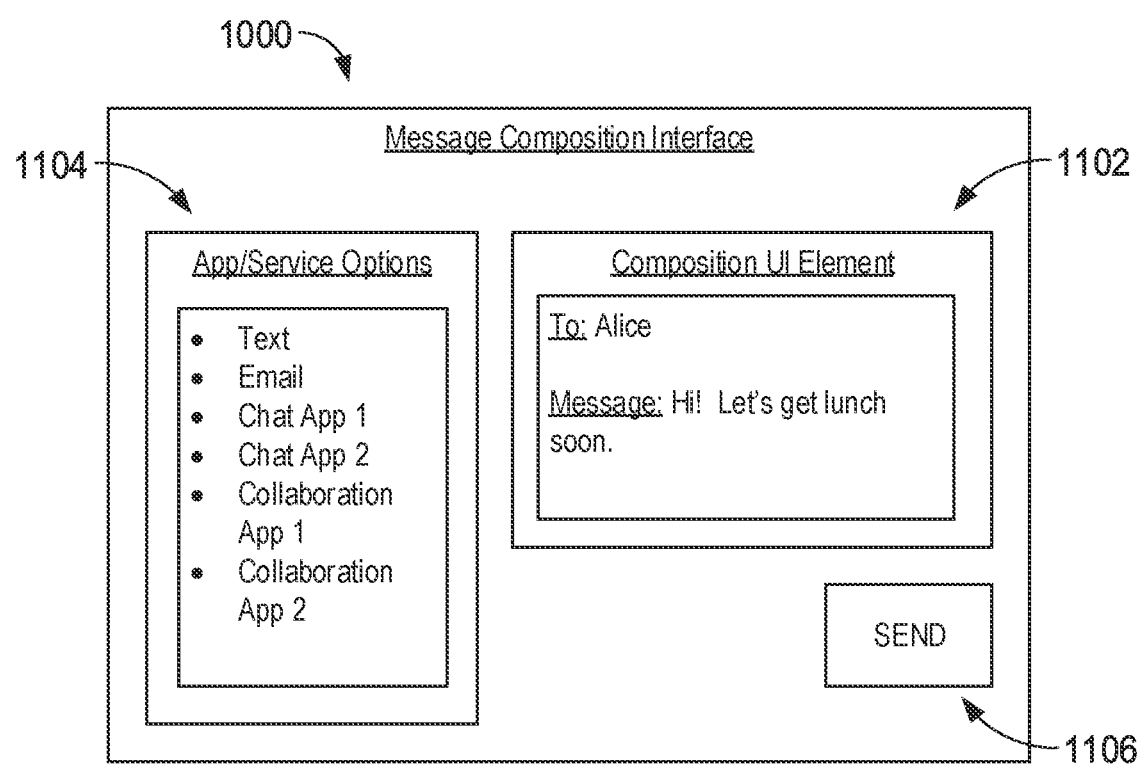
FIG. 11 is a diagram of an example message composition interface.

An example message composition interface 1000 is shown in greater detail in FIG. 11. The message composition interface 1000 includes a first user interface (UI) element 1102 (also referred to as a composition UI element 1102), a second UI element 1104 (also referred to as an option selection UI element 1104), and a send button 1106.

The composition UI element 1102 is configured to present a working draft of a message. As an example, the composition UI element 1102 can indicate the recipient (or recipients) of the message. For instance, the composition UI element 1102 can indicate one or more names, email address, telephone numbers, user names, and/or other identifiers that are associated with the user (or users) who are to receive the message.

As another example, the composition UI element 1102 can indicate the contents of the message. For instance, the composition UI element 1102 can indicate text, images, videos, audio, or any other content for inclusion in the message.

Further, the composition UI element 1102 allows a user to edit the recipients and/or contents of the message. For example, the user can select the composition UI element, and provide user input specifying one or more recipients of the message, the contents of the message, and/or revisions to the recipients and/or contents. In some implementations, the user can provide user input via an external device, such as a keyboard, a mouse, and/or a touch sensitive display, wired or wirelessly coupled to the wearable multimedia device 101. In some implementations, the user can provide user input by performing one or more gestures that are detected and interpreted by the wearable multimedia device 101 (e.g., using the camera/video subsystem 820, depth sensor(s) 814, etc.). In some implementations, the user can provide user input through spoken commands that are detected and interpreted by the wearable multimedia device 101 (e.g., using the microphones 830 and a speech recognition engine).

The option selection UI element 1104 is configured to present one or more applications and/or services that can be selected by the user to transmit the message to the recipient (or recipients). In some implementations, the applications and/or services can include a text messaging application or service (e.g., an application or service that exchanges message using Short Message Service (SMS) and/or Rich Communication Service (RCS)). In some implementations, the applications and/or services can include an email application or service (e.g., Outlook®, Microsoft Exchange®, Google® Mail, iCloud Mail®, etc.). In some implementations, the applications and/or services can include a chat or instant messaging application or service (e.g., Signal®, Telegram®, WhatsApp®, Facebook Messenger®, applications or services utilizing, for example, Extensible Messaging and Presence Protocol (XMPP), etc.). In some implementations, the applications and/or services can include a collaboration application or service (e.g., Slack, Microsoft Teams, Discord, etc.). In some implementations, the applications and/or services can include a social media application or service (e.g., Facebook, Twitter, Instagram, etc.).

In some implementations, the user can make a selection from the option selection UI element 1104 via an external device, such as a keyboard, a mouse, and/or a touch sensitive display, wired or wirelessly coupled to the wearable multimedia device 101. In some implementations, the user can make a selection by performing one or more gestures that are detected and interpreted by the wearable multimedia device 101 (e.g., using the camera/video subsystem 820, depth sensor(s) 814, etc.). In some implementations, the user can make a selection through spoken commands that are detected and interpreted by the wearable multimedia device 101 (e.g., using the microphones 830 and a speech recognition engine).

In some implementations, the wearable multimedia device 101 can determine which of the applications and/or services can be used to transmit a message to a particular recipient, and selectively indicate those applications and/or services to the user via the option selection UI element 1104 (e.g., by visually emphasizing those applications and/or services in the option selection UI element 1104). The remaining applications and/or services can be visually deemphasized in the option selection UI element 1104, or omitted from the option selection UI element 1104 entirely. This can be beneficial, for example, in reducing input errors from the user.

As an example, if a user indicates that she wishes to transmit a message to a user "Alice," the wearable multimedia device 101 can identify the applications and/or services for which Alice's contact information is known, and visually emphasize those applications and/or services to the user via the option selection UI element 1104 (e.g., by presenting those applications and/or services with a bold font, a distinctive color or pattern, a represented status icon, etc.). Further, the wearable multimedia device 101 can identify the applications and/or services for which Alice's contact information is not known, and visually deemphasize those applications and/or services to the user via the option selection UI element 1104 (e.g., by presenting those applications and/or services with a non-bolded font, a less distinctive color or pattern, a representative status icon, etc.), or omit those applications and/or services from the option selection UI element 1104 entirely.

As another example, if a user indicates that she wishes to transmit a message to a user "Alice," the wearable multimedia device 101 can identify the applications and/or services for which Alice's contact information is known. Further, the wearable multimedia device 101 can obtain presence information for Alice with respect to each of those applications and/or services. Presence information can represent, for example, the ability and/or willingness of the recipient to communicate using each application and/or service. For instance, Alice's presence information may indicate that she is available to correspond with others via a certain application and/or service (e.g., "available," "active," etc.), whereas her presence information may indicate that she is unavailable to correspond with others via another application and/or service (e.g., "busy," "away," "do not disturb," "offline," etc.). Using the option selection UI element 1104, the wearable multimedia device 101 can visually emphasize the applications and/or services for which Alice's contact information is known and for which Alice's presence information indicates that she is available to correspond with others. Further, the wearable multimedia device can visually deemphasize the applications and/or services for which Alice's contact information is not known and/or for which Alice's presence information indicates that she is not available to correspond with others, or omit those applications and/or services from the option selection UI element 1104 entirely.

In some implementations, the wearable multimedia device can obtain historical data that includes previous communications between the user and the recipient (or recipients). Based on the historical information, the wearable multimedia device can determine the applications and/or services that the user and the recipient previously used to communicate with one another. In some implementations, the wearable multimedia device can visually emphasize one or more of the applications and/or services that the user and the recipient previously used to communicate with one another. For example, the wearable multimedia device can visually emphasize the application and/or service that the user and the recipient most frequently used to communicate with one another. As another example, the wearable multimedia device can visually emphasize the application and/or service that the user and the recipient most recently used to communicate with one another.

As an example, if a user indicates that she wishes to transmit a message to a user "Alice," the wearable multimedia device 101 can obtain historical data that includes previous communications between the user and Alice. Based on the historical information, the wearable multimedia device 101 can determine the applications and/or services that the user and Alice previously used to communicate with one another, and visually emphasize one or more of the applications and/or services using the option selection UI element 1104. For example, the wearable multimedia device can sort the applications and/or services in order of their frequency of use in communicating with Alice, and/or highlight the most frequently used application or service in communicating with Alice. As another example, the wearable multimedia device can sort the applications and/or services in order of their recency of use in communicating with Alice, and/or highlight the most recently used application or service in communicating with Alice.

In some implementations, the wearable multimedia device can obtain quality metrics for each of the applications and/or services. The quality metrics can represent, for example, the reliability, the latency, and/or the speed of each of the applications and/or services in communicating with other users. As an example, an application or service having a high quality metric may facilitate communications between users according to a high degree of reliability, low latency, and/or high speed. As another example, an application or service having a low quality metric may facilitate communications between users according to a low degree of reliability, high latency, and/or low speed.

In some implementations, the wearable multimedia device can visually emphasize one or more of the applications and/or services based on the quality metrics. For example, the wearable multimedia device can visually emphasize applications and/or services having a high quality metric (e.g., greater than a threshold value).

As an example, if a user indicates that she wishes to transmit a message to a user "Alice," the wearable multimedia device 101 can obtain quality metrics for each of the applications and/or services for which Alice's contact information is known. Based on the quality metrics, the wearable multimedia device 101 can visually emphasize one or more of the applications and/or services using the option selection UI element 1104. For example, the wearable multimedia device can sort the applications and/or services in order of their quality metrics (e.g., from highest to lowest), and/or highlight the application or service having the highest quality metric).

In some implementations, the user can manually instruct the wearable multimedia device 101 to transmit the message (e.g., by selecting the send button 1106, performing a particular gesture, providing a particular spoken command, etc.). The wearable multimedia device 101 can transmit the message to the specified recipient (or recipients) in response to receiving the user's instructions.

In some implementations, the wearable multimedia device 101 can automatically transmit the message to the specified recipient (or recipients) in response to the user selecting an application and/or service from the option selection window 1104.

In some implementations, if the user instructs the wearable multimedia device to transmit the message, but does not specify the application and/or service with which to transmit the message, the wearable multimedia device 101 can automatically select an application and/or service for transmitting the message. As an example, the wearable multimedia device 101 can select an application and/or service based on historical data that includes previous communications between the user and the recipient (e.g., the application and/or service that was most recently used by the users to communicate with one another, the application and/or service that was most frequently used by the users to communicate with one another, etc.). As another example, the wearable multimedia device 101 can select an application and/or service based the quality metrics for each of the applications and/or services (e.g., the application and/or service having the highest quality metric).

As described above, the message composition interface 1000 can be configured to receive first user input specifying the recipient of the message and the contents of the message (e.g., via the composition UI element 1102). Subsequently, the message composition interface 1000 can receive second user input specifying a particular application and/or service for transmitting the message (e.g., via the option selection window 1104). An example of this process is shown in FIGS. 12A-12D.

Figure 12A:
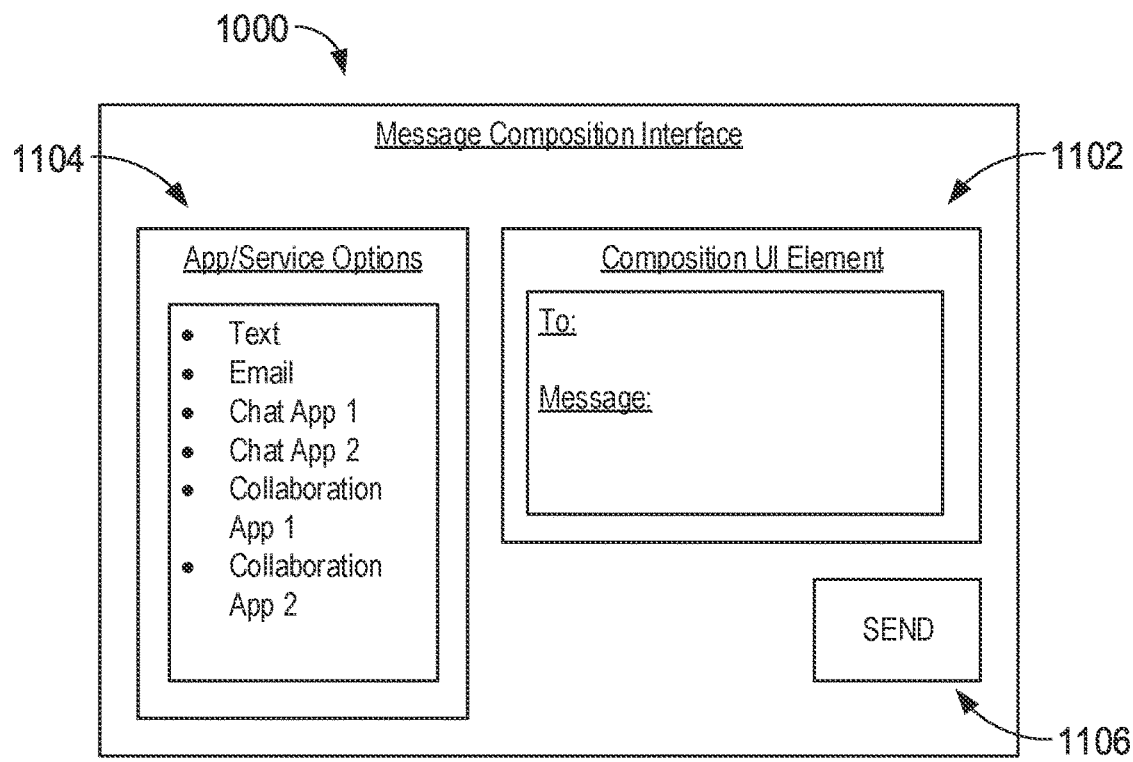
FIGS. 12A-12D are diagrams of example operations relating to a message composition interface.

As shown, in FIG. 12A, the wearable multimedia device 101 presents the message composition interface 1000 to a user. In some implementations, the message composition interface 1000 can be a VI that is presented, at least in part, using a projector subsystem 832. As discussed above, the message composition interface 1000 includes a composition window 1102 for presenting a working draft of a message, and an option selection UI element 1104 for presenting one or more applications and/or services that can be selected by the user to transmit the message to the recipient (or recipients).

In this example, the composition UI element 1102 includes a blank or empty portion for inputting the recipient (or recipients) of the message. Further, the composition UI element 1102 includes a blank or empty portion for inputting the contents of the message.

Further, the option selection UI element 1104 presents several applications and/or services for transmitting the message to the recipient. In this example, each of the applications and/or services are presented according to a similar visual appearance or style (e.g., such that one application and/or service is not visually emphasized over another).

As described above, a user can provide user input specifying the recipient (or recipients) of the message and the contents of the message using the composition UI element 1102. For instance, in the example shown in FIG. 12B, the user has inputted "Alice" as a recipient, and inputted a draft message to Alice using the composition UI element 1102.

The wearable multimedia device 101 can modify the appearance of the option selection UI element 1104 based on the users input in the composition UI element 1102. For instance, as described above, the wearable multimedia device 101 can determine which of the applications and/or services can be used to transmit a message to the specified recipient, and selectively indicate those applications and/or services to the user via the option selection UI element.

As an example, based on the user specifying "Alice" as a recipient, the wearable multimedia device 101 can determine whether contact information is available for Alice for each of the applications and/or services. Further, the wearable multimedia device can determine whether Alice's presence information indicates she is available to correspond with other users using each of those applications and/or services. In this example, the wearable multimedia device 101 has determined that Alice's contact information is known for a text application or service ("Text"), an email application or service ("Email"), a first chat application or service ("Chat App 1"), and a first collaboration application or service ("Collaboration App 1"). Further, the wearable multimedia device 101 determines that Alice's presence information indicates that she is available to correspond with other users using each of these applications or services. Based on this determination, the wearable multimedia device visually emphasizes each of these applications and/or services (e.g., by presenting these applications and/or services using a bolded font).

Further, in this example, the wearable multimedia device 101 has determined that either Alice's contact information is not known for a second chat application or service ("Chat App 2") and a second collaboration application or service ("Collaboration App 2"), or that Alice's presence information indicates that she is not available to correspond with other users using each of these applications or services. Based on this determination, the wearable multimedia device visually de-emphasizes each of these applications and/or services (e.g., by presenting these applications and/or services using a non-bonded font). Further, the wearable multimedia device indicates that these applications and/or services are unavailable for contacting Alice using an "X" icon.

The user can use the option selection UI element 1104 to select one of the applications and/or services for transmitting the message. For example, as shown in FIG. 12C, the user can align this finger 1202 with one of the applications and/or services (e.g., "Chat App 1"), and confirm her selection of that application and/or service. In some implementations, the user can confirm her selection using her finger 1202. For example, the user can tap or press her finger 1202 on the surface upon which the message composition interface 1000 is projected, such that the tip of the user's finger 1202 coincides with the selected application and/or service. In some implementations, the user can confirm her selection using the hand upon which the VI is projected. For example, while the user is hovering her finger 102 one of the applications and/or services, using her other hand (e.g., the hand upon which the VI is projected), the user can touch the tip of her thumb with the tip of another finger, such as her index finger. In some implementations, the user's selection can be visually indicated in the option selection UI element 1104 (e.g., using a border or outline around the selected application and/or service).

As described, in some implementations, the user can manually instruct the wearable multimedia device 101 to transmit the message. For example, as shown in FIG. 12D, the user can select the send button 1106 (e.g., by aligning her finger 1202 with the send button 1106, and tapping or pressing the surface upon which the message composition interface 1000 is projected). As another example, a user can hover her finger 1202 over the send button 1106, and perform a gesture with her other hand (e.g., by touching the tip of her thumb with the tip of another finger, such as her index finger). The wearable multimedia device 101 can transmit the message to the specified recipient (or recipients) in response to receiving the user's instructions.

Further, in some implementations, the wearable multimedia device 101 can automatically transmit the message to the specified recipient (or recipients) in response to the user selecting an application and/or service from the option selection UI element 1104. Accordingly, the user need not manually select the send button 1106 to instruct the wearable multimedia device 101 to send the message.

Although FIGS. 12A-12D show example operations by a wearable multimedia device, these are merely illustrative examples. In practice, other operations can be performed by wearable multimedia device to present a message composition interface, either instead or in addition to those shown in FIGS. 12A-12D.

Figure 12B:
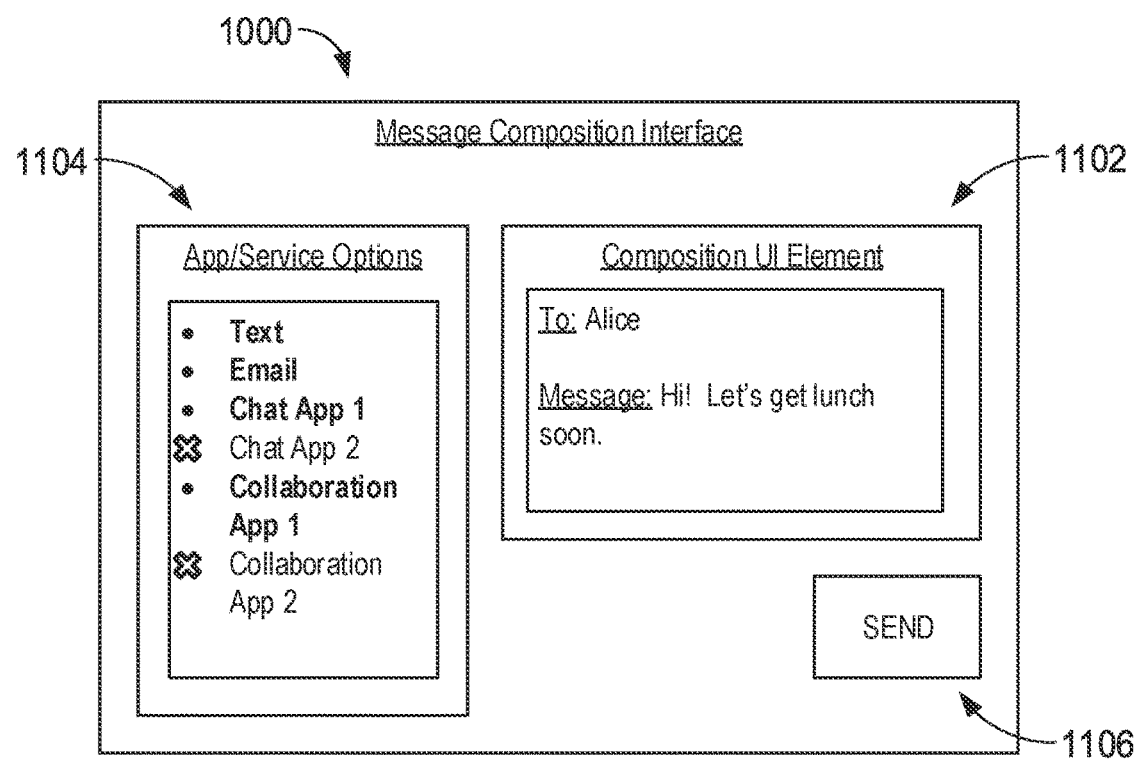
Figure 12C:
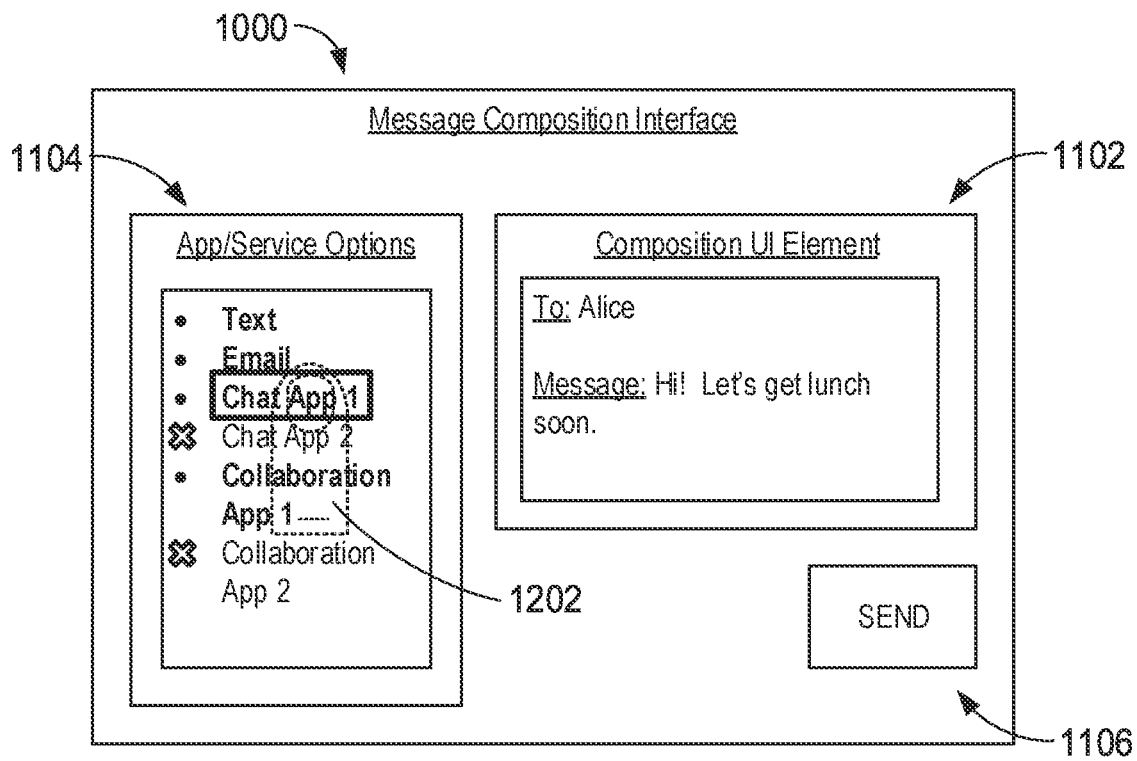
Figure 12D:
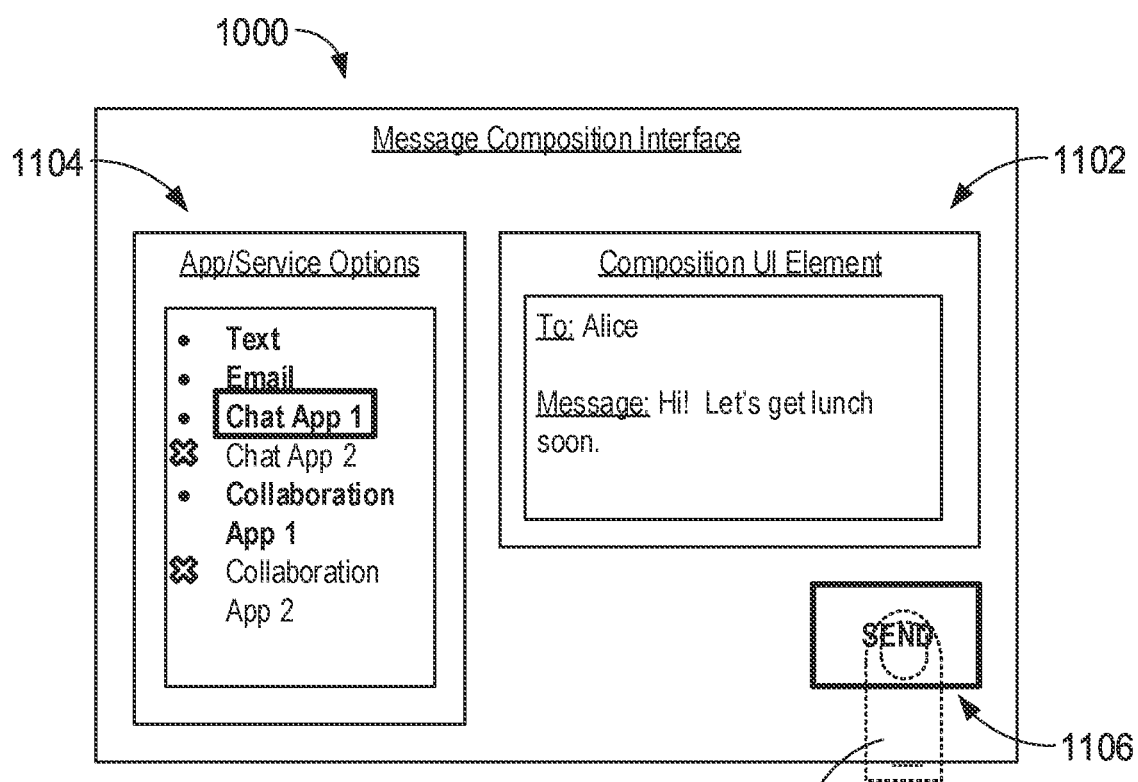

As an example, FIG. 12B shows modifications to the option selection UI interface 1104, whereby certain application and/or services are visually emphasized using a bold font, and other applications and/or services are visually deemphasized using a non-bold font and a represented icon (e.g., a "X" icon). However, as described above, in some implementations the option selection UI interface 1104 can be modified by changing the order in which the applications and/or services are presented. For example, the applications and/or services can be ordered and re-ordered based on (i) whether contact information is available for the recipient for each application and/or service, (ii) the presence information for the recipient for each application and/or service, (iii) historical data regarding previous communications between the user and the recipient, (iv) quality metrics for each applications and/or services, or any other criteria.

As another example, as described above, the option selection UI interface 1104 can be modified by filtering the applications and/or services, such that certain applications and/or services are omitted from the option selection UI interface 1104 entirely. For example, the applications and/or services can be filtered based on (i) whether contact information is available for the recipient for each application and/or service, (ii) the presence information for the recipient for each application and/or service, (iii) historical data regarding previous communications between the user and the recipient, (iv) quality metrics for each applications and/or services, or any other criteria.

Although FIGS. 10-12D describe example operations that can be performed using a VI (e.g., a VI that is projected by a projector subsystem 832), in practice, similar operations also can be performed using other types of user interfaces. As an example, some or all of these operations can be performed using a user interface that is presented using a display device such as a computer monitor or a touch sensitive display panel.

Additional Example Processes

Figure 13:
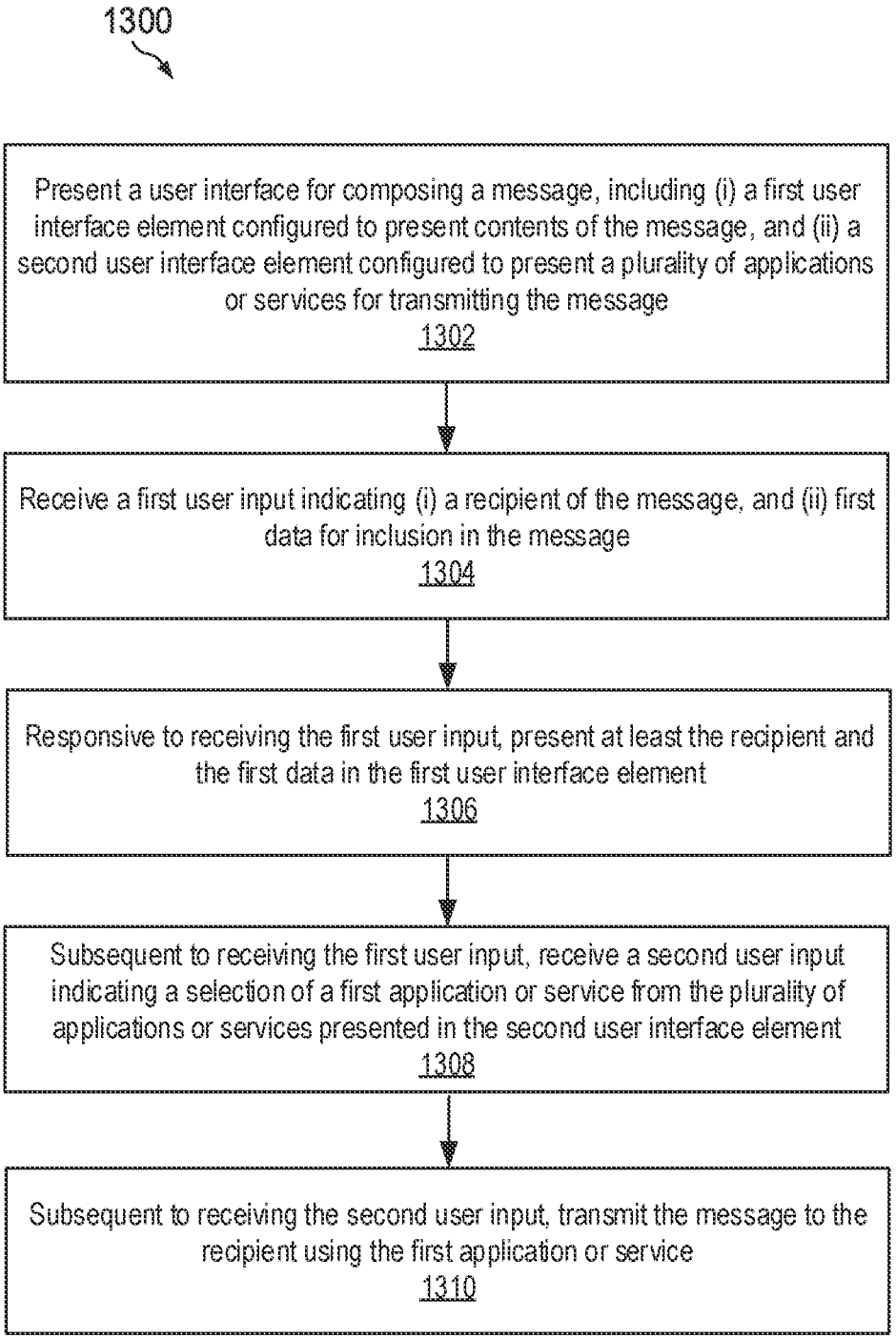
FIG. 13 is flow diagram of a process for presenting a message composition interface, according to an embodiment.

FIG. 13 is flow diagram of an example process 1300 for presenting a message composition interface, according to an embodiment. Process 1300 can be implemented using wearable multimedia devices 101 described in reference to FIGS. 1-9.

According to the process 1300, a wearable multimedia device presents a user interface for composing a message (block 1302). The user interface includes a first user interface element configured to present contents of the message. Further, the user interface includes a second user interface element configured to present a plurality of applications or services for transmitting the message.

In some implementations, presenting the user interface can include projecting the user interface on a surface using a laser projector of the wearable multimedia device. In some implementations, the surface can be a surface of a hand of a user. In some implementations, the surface can be a palm of a user.

In some implementations, the plurality of applications or services can include at least one of: an e-mail application or service, a text message application or service, a chat application or service, or a collaboration application or service.

Further, the wearable multimedia device receives a first user input indicating a recipient of the message, and first data for inclusion in the message (block 1304).

In some implementations, receiving the first user input can include generating, using one or more microphones of the wearable multimedia device, a first audio signal representing a first spoken command by a user. Further, the wearable multimedia device can determine the first user input based on the first audio signal.

Responsive to receiving the first user input, the wearable multimedia device presents at least the recipient and the first data in the first user interface element (block 1306).

Further, subsequent to receiving the first user input, the wearable multimedia device receives a second user input indicating a selection of a first application or service from the plurality of applications or services presented in the second user interface element (block 1308).

In some implementations, receiving the second user input can include generating, using the one or more microphones of the wearable multimedia device, a second audio signal representing a second spoken command by the user. Further, the wearable multimedia device can determine the second user input based on the second audio signal.

In some implementations, receiving the first user input can include detecting, using one or more cameras or depth sensors of the wearable multimedia device, one or more first gestures performed by the user, and determining the first user input based on the one or more first gestures. Further, receiving the second user input can include detecting, using the one or more cameras or depth sensors of the wearable multimedia device, one or more second gestures performed by the user; and determining the second user input based on the one or more second gestures.

Further, subsequent to receiving the second user input, the wearable multimedia device transmits the message to the recipient using the first application or service (block 1310).

In some implementations, the wearable multimedia device can transmit the message responsive to receiving the second user input.

In some implementations, the wearable multimedia device can receive a third user input instructing the wearable multimedia device to transmit the message. Further, the wearable multimedia device can transmit the message responsive to receiving the third user input.

In some implementations, the wearable can receive the first user input, and in response to receiving the first user input, modify the second user interface element based on the recipient.

In some implementations, modifying the second user interface elements can include determining an availability of the recipient to receive messages using a first subset of the plurality of applications or services, and visually emphasizing the first subset of the plurality of applications or services in the second user interface element.

In some implementations, determining the availability of the recipient to receive messages using the first subset of the plurality of applications or services can include obtaining, for each of the plurality of applications or services, presence information regarding the recipient. The presence information can indicate at least one of an availability or an unavailability of the recipient to receive messages using that application or service. Further, the wearable multimedia device can determine, based on the presence information, that the recipient is available to receive messages using the first subset of the plurality of applications or services.

In some implementations, modifying the second user interface elements can include determining an unavailability of the recipient to receive messages using a second subset of the plurality of applications or services. Further, the wearable multimedia device can perform at least one of (i)

remove the second subset of the plurality of applications or services from the second user interface element, or (ii) visually deemphasize the second subset of the plurality of applications or services in the second user interface element.

In some implementations, modifying the second user interface elements can include obtaining historical data including previous communications between the user and the recipient, determining that the user and the recipient previously communicated with one another using a particular application or service from among the plurality of application or service, and visually emphasizing that application or service in the second user interface element.

In some implementations, modifying the second user interface elements can include determining a quality metric for each of the plurality of applications or services, and visually emphasizing one or more of the plurality of applications or services based on the quality metrics.

In some implementations, for each of the plurality of applications or services, the quality metric can represents at least one of (i) a reliability of the application or service, or (ii) a latency of the application or service.

In some implementations, modifying the second user interface element can include at least one of: modifying an order of the plurality of applications or services, filtering the plurality of applications or services, visually emphasizing at least some of the plurality of applications or services, or visually deemphasizing at least some of the plurality of applications or services.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
presenting, by a wearable multimedia device, a user interface for composing a message, wherein presenting the user interface comprises concurrently presenting:
a first user interface element configured to present contents of the message, and
a second user interface element configured to present a plurality of applications or services for transmitting the message;
receiving, by the wearable multimedia device, a first user input indicating:
a recipient of the message, and
first data for inclusion in the message;
responsive to receiving the first user input:
presenting, by the wearable multimedia device, at least the recipient and the first data in the first user interface element, and modifying the second user interface element based on the recipient;

subsequent to receiving the first user input, receiving, by the wearable multimedia device, a second user input indicating a selection of a first application or service from the plurality of applications or services presented in the second user interface element; and subsequent to receiving the second user input, transmitting, by the wearable multimedia device, the message to the recipient using the first application or service.

2. The method of claim 1, wherein the wearable multimedia device transmits the message responsive to receiving the second user input.

3. The method of claim 1, further comprising:
receiving, by the wearable multimedia device, a third user input instructing the wearable multimedia device to transmit the message,
wherein the wearable multimedia device transmits the message responsive to receiving the third user input.

4. The method of claim 1, wherein presenting the user interface comprises:
projecting, using a laser projector of the wearable multimedia device, the user interface on a surface.

5. The method of claim 4, wherein the surface is a surface of a hand of a user.

6. The method of claim 4, wherein the surface is a palm of a user.

7. The method of claim 1, wherein receiving the first user input comprises:
generating, using one or more microphones of the wearable multimedia device, a first audio signal representing a first spoken command by a user; and
determining the first user input based on the first audio signal.

8. The method of claim 1, wherein receiving the second user input comprises:
generating, using one or more microphones of the wearable multimedia device, a second audio signal representing a second spoken command by the user; and
determining the second user input based on the second audio signal.

9. The method of claim 1, wherein receiving the first user input comprises:
detecting, using one or more cameras or depth sensors of the wearable multimedia device, one or more first gestures performed by the user; and
determining the first user input based on the one or more first gestures.

10. The method of claim 9, wherein receiving the second user input comprises:
detecting, using the one or more cameras or depth sensors of the wearable multimedia device, one or more second gestures performed by the user; and
determining the second user input based on the one or more second gestures.

11. The method of claim 1, wherein the plurality of applications or services comprises at least one of:
an e-mail application or service,
a text message application or service,
a chat application or service, or
a collaboration application or service.

12. The method of claim 1, wherein modifying the second user interface element comprises:
determining an availability of the recipient to receive messages using a first subset of the plurality of applications or services; and
visually emphasizing the first subset of the plurality of applications or services in the second user interface element.

13. The method of claim 12, wherein determining the availability of the recipient to receive messages using the first subset of the plurality of applications or services comprises:
obtaining, for each of the plurality of applications or services, presence information regarding the recipient, wherein the presence information indicates at least one of an availability or an unavailability of the recipient to receive messages using that application or service; and
determining, based on the presence information, that the recipient is available to receive messages using the first subset of the plurality of applications or services.

14. The method of claim 12, wherein modifying the second user interface element comprises:
determining an unavailability of the recipient to receive messages using a second subset of the plurality of applications or services; and
at least one of:
removing the second subset of the plurality of applications or services from the second user interface element, or
visually deemphasizing the second subset of the plurality of applications or services in the second user interface element.

15. The method of claim 1, wherein modifying the second user interface element comprises:
obtaining historical data comprising previous communications between the user and the recipient;
determining that the user and the recipient previously communicated with one another using a particular application or service from among the plurality of applications or services; and
visually emphasizing that application or service in the second user interface element.

16. The method of claim 1, wherein modifying the second user interface element comprises:
determining a quality metric for each of the plurality of applications or services; and
visually emphasizing one or more of the plurality of applications or services based on the quality metrics.

17. The method of claim 16, wherein, for each of the plurality of applications or services, the quality metric represents at least one of:
a reliability of the application or service, or
a latency of the application or service.

18. The method of claim 1, wherein modifying the second user interface element comprises at least one of:
modifying an order of the plurality of applications or services,
filtering the plurality of applications or services,
visually emphasizing at least some of the plurality of applications or services, or
visually deemphasizing at least some of the plurality of applications or services.

19. A wearable multimedia device, comprising:
at least one processor; and
memory storing instructions that, when executed by the at least one processor, cause the at least one processor to perform operations comprising:
presenting a user interface for composing a message, wherein presenting the user interface comprises concurrently presenting:
a first user interface element configured to present contents of the message, and a second user interface element configured to present a plurality of applications or services for transmitting the message;
receiving a first user input indicating:
a recipient of the message, and
first data for inclusion in the message;
responsive to receiving the first user input:
presenting at least the recipient and the first data in the first user interface element, and
modifying the second user interface element based on the recipient;
subsequent to receiving the first user input, receiving a second user input indicating a selection of a first application or service from the plurality of applications or services presented in the second user interface element; and
responsive to receiving the second user input, transmitting the message using the first application or service.

20. One or more non-transitory computer-readable media storing instructions that, when executed by at least one processor, cause the at least one processor to perform operations comprising:

presenting a user interface for composing a message, wherein presenting the user interface comprises concurrently presenting:
a first user interface element configured to present contents of the message, and
a second user interface element configured to present a plurality of applications or services for transmitting the message;
receiving a first user input indicating:
a recipient of the message, and
first data for inclusion in the message;
responsive to receiving the first user input
presenting at least the recipient and the first data in the first user interface element, and
modifying the second user interface element based on the recipient;
subsequent to receiving the first user input, receiving a second user input indicating a selection of a first application or service from the plurality of applications or services presented in the second user interface element; and
responsive to receiving the second user input, transmitting the message using the first application or service.

* * * * *